US011416006B2

(12) United States Patent
Garhart

(10) Patent No.: US 11,416,006 B2
(45) Date of Patent: Aug. 16, 2022

(54) INTEGRATION OF REAL TIME METADATA IN THE EVALUATION OF LANDING ZONES

(71) Applicant: Lockheed Martin Corporation, Bethesda, MD (US)

(72) Inventor: Jonathan K. Garhart, Seymour, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 365 days.

(21) Appl. No.: 16/718,769

(22) Filed: Dec. 18, 2019

(65) Prior Publication Data

US 2021/0191425 A1 Jun. 24, 2021

(51) Int. Cl.
G05D 1/00 (2006.01)
B64C 39/02 (2006.01)
H04W 4/00 (2018.01)
G05D 1/04 (2006.01)
H04W 4/42 (2018.01)
H04W 4/021 (2018.01)

(52) U.S. Cl.
CPC ........... *G05D 1/042* (2013.01); *B64C 39/024* (2013.01); *H04W 4/021* (2013.01); *H04W 4/42* (2018.02); *B64C 2201/141* (2013.01)

(58) Field of Classification Search
CPC ........ G05D 1/042; G05D 1/0676; G05D 1/00; B64C 39/024; B64C 2201/141; H04W 4/021; H04W 4/42; H04W 4/00; G08G 5/0013; G08G 5/0021; G08G 5/0086; G08G 5/00
See application file for complete search history.

(56) References Cited

U.S. PATENT DOCUMENTS

| 7,974,745 | B2 * | 7/2011 | Fok | G06Q 40/08 342/36 |
| 8,244,414 | B2 * | 8/2012 | Fok | G08G 5/0043 701/3 |
| 10,312,994 | B2 * | 6/2019 | Priest | H04W 4/021 |
| 10,720,066 | B2 * | 7/2020 | Priest | G08G 5/0021 |
| 10,723,483 | B2 * | 7/2020 | Priest | B64C 39/024 |
| 10,789,853 | B2 * | 9/2020 | Priest | G08G 5/0026 |
| 2017/0171720 | A1 | 6/2017 | Holleczek et al. | |

* cited by examiner

*Primary Examiner* — Yonel Beaulieu
(74) *Attorney, Agent, or Firm* — Foley & Lardner LLP

(57) ABSTRACT

A technique relates to evaluating autonomous landing of an aircraft. An autonomous vehicle receives cellular metadata and determines whether a landing site is suitable for the autonomous vehicle based on the cellular metadata.

14 Claims, 6 Drawing Sheets

INTEGRATION OF REAL TIME METADATA IN THE EVALUATION OF LANDING ZONES

BACKGROUND

Exemplary embodiments relate to the art of rotary or fixed wing aircraft, and more particularly, integration of real-time cellular metadata in the evaluation of landing zones.

BRIEF DESCRIPTION

According to one or more embodiments, a method for evaluating autonomous landing is provided. The method includes receiving, by an autonomous vehicle, cellular metadata, and determining whether a landing site is suitable for the autonomous vehicle based on the cellular metadata.

In addition to one or more of the features described above or below, or as an alternative, further embodiments could include selecting the landing site to land the autonomous vehicle in response to determining that the landing site is suitable based on the cellular metadata.

In addition to one or more of the features described above or below, or as an alternative, further embodiments could include selecting an alternative landing site in response to determining that the landing site is unsuitable based on the cellular metadata.

In addition to one or more of the features described above or below, or as an alternative, further embodiments could include checking whether the alternative landing site is suitable based on the cellular metadata.

In addition to one or more of the features described above or below, or as an alternative, further embodiments could include selecting the alternative landing site to land the autonomous vehicle in response to determining that the alternative landing site is suitable based on the cellular metadata.

In addition to one or more of the features described above or below, or as an alternative, further embodiments could include wherein the cellular metadata comprises cellular phone density data associated with the landing site.

In addition to one or more of the features described above or below, or as an alternative, further embodiments could include wherein determining whether the landing site is suitable based on the cellular metadata comprises checking whether cellular phone density data associated with the landing site meets a threshold requirement.

In addition to one or more of the features described above or below, or as an alternative, further embodiments could include landing the autonomous vehicle at the landing site in response to the cellular phone density data associated with the landing site meeting the threshold requirement.

In addition to one or more of the features described above or below, or as an alternative, further embodiments could include avoiding the landing site in response to the cellular phone density data associated with the landing site failing to meet the threshold requirement.

In addition to one or more of the features described above or below, or as an alternative, further embodiments could include wherein the autonomous vehicle is an aircraft.

According to one or more embodiments, a system for evaluating autonomous landing is provided. The system includes a processor and memory coupled to the processor and comprising computer-executable instructions that, when executed by the processor, cause the processor to perform operations. The operations include receiving, via an autonomous vehicle, cellular metadata, and determining whether a landing site is suitable for the autonomous vehicle based on the cellular metadata.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatuses and methods are presented herein by way of exemplification and not limitation with reference to the Figures. One or more embodiments provide an autonomous landing site selection system utilizing cellular (cell) phone metadata in the evaluation of landing zones. The autonomous landing site selection system is configured to integrate real-time cell phone metadata, similar to that used by route finding applications, to gauge the probability of the presence of people in the area of a landing site. The presence of human activity, such as a temporary farmers market, might make an otherwise ideal landing site unusable. Cell phone traffic in the area would provide an indication of the presence of pedestrian traffic, vehicular traffic, etc.

Autonomy controls may rely on a synthetic world map and sensor data to assess the suitability of landing sites. While many factors and conditions can be ascertained through the historic information used to compile the world map and real time sensor data, the presence of people at a specific location may be difficult to determine. One or more embodiments provide an additional layer of real-time cell phone metadata having real time information about the situation on the ground and adds to the reliability of safe landing site predictions.

Figure 1:
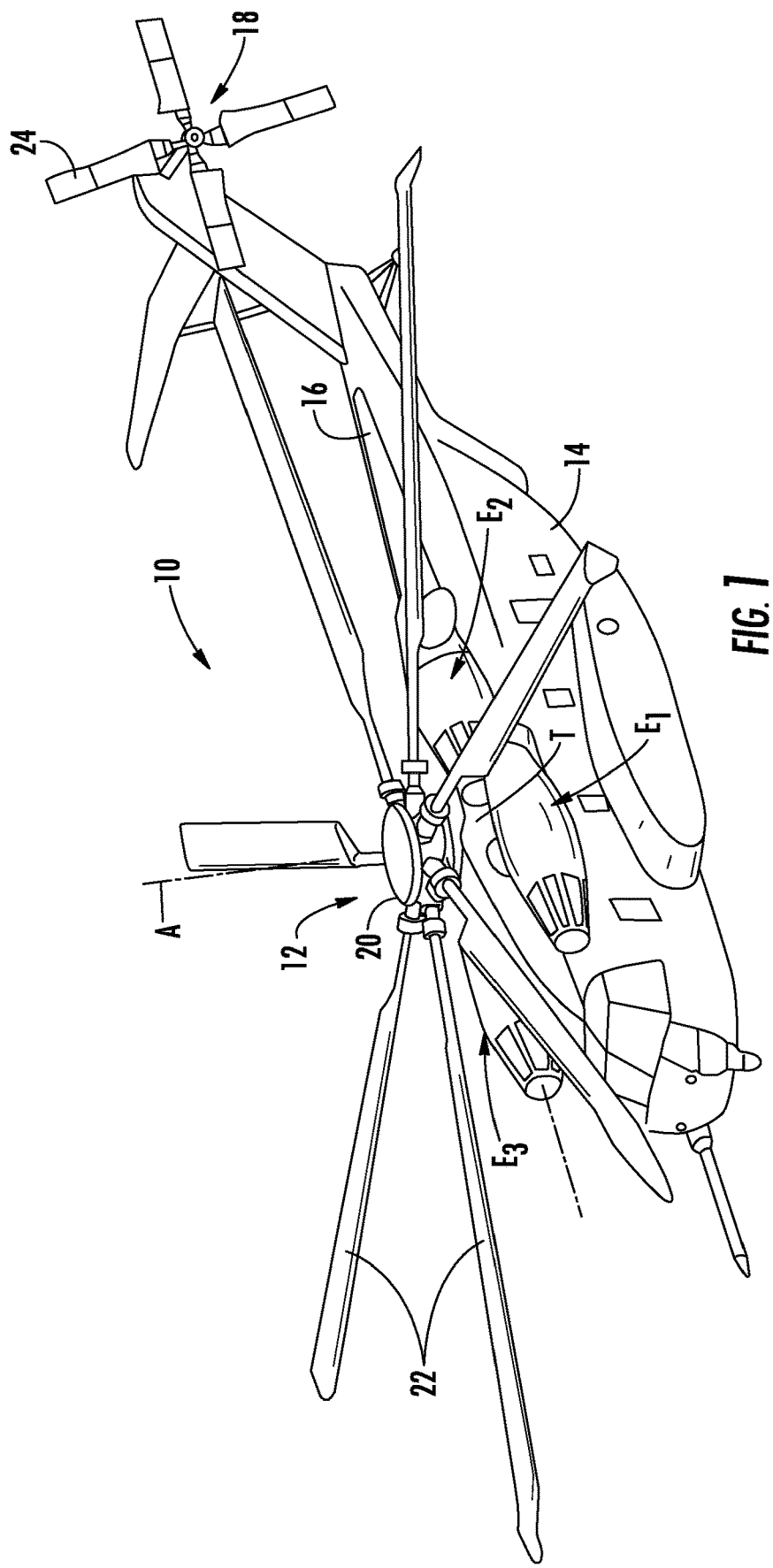
FIG. 1 depicts a rotary wing aircraft in accordance with one or more embodiments.

FIG. 1 schematically illustrates an exemplary vertical takeoff and landing (VTOL) rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention. Although details relating to rotary wing aircraft may be discussed, it should be appreciated that embodiments are not meant to be limited to rotary wing aircraft and apply to autonomous landing applications for any type of autonomous aircraft.

Figure 2:
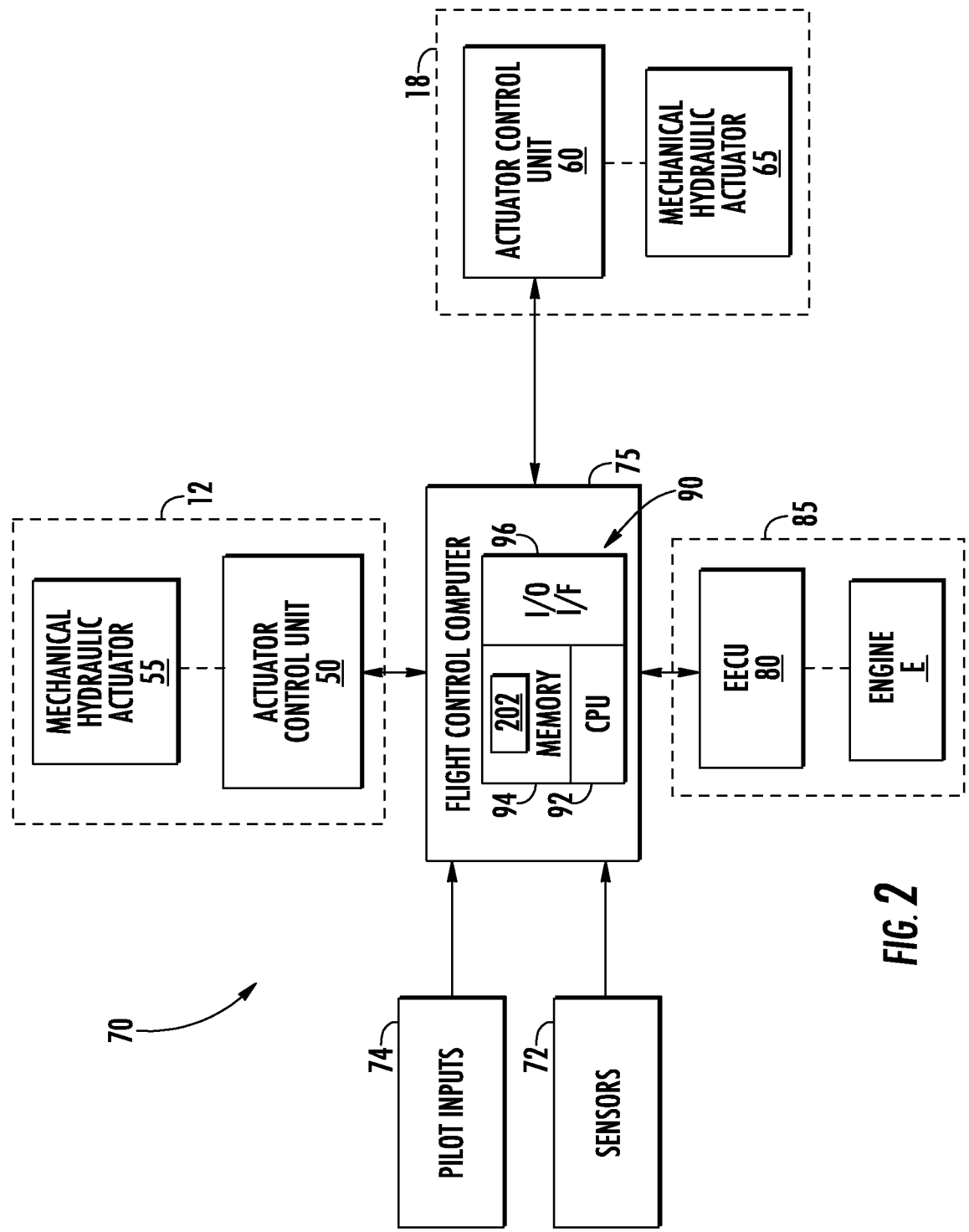
FIG. 2 depicts a schematic diagram of a flight control system in accordance with one or more embodiments.

Portions of the aircraft 10, such as the main rotor system 12 and the tail rotor system 18 for example, are driven by a flight control system 70 illustrated in FIG. 2. In one embodiment, the flight control system 70 is a fly-by-wire (FBW) control system. In a FBW control system, there is no direct mechanical coupling between a pilot's controls and movable components or control surfaces, such as rotor blade assemblies 22 or propeller blades 24 for example, of the aircraft 10 of FIG. 1. Instead of using mechanical linkages, a FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive pilot inputs 74 as control commands to control the lift, propulsive thrust, yaw, pitch, and roll forces and moments of the various control surfaces of the aircraft 10.

In response to inputs from the sensors 72 and pilot inputs 74, the FCC 75 transmits signals to various subsystems of the aircraft 10, such as the main rotor system 12 and the tail rotor system 18. The FCC 75 can use reference values in the pilot inputs 74 for feed forward control to quickly respond to changes in the reference values and can perform feedback control to reject disturbances detected via the sensors 72. Pilot inputs 74 can be in the form of stick commands and/or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10. The pilots inputs 74 can provide autonomous control of the aircraft 10 without human intervention (thereby flying as an autonomous aircraft) and/or enable the aircraft 10 to be an optionally piloted vehicle.

The main rotor system 12 can include an actuator control unit 50 configured to receive commands from the FCC 75 to control one or more actuators 55, such as a mechanical-hydraulic actuator, for the rotor blade assemblies 22 of FIGS. 1 and 2. In an embodiment, pilot inputs 74 including cyclic and/or collective commands may result in the actuator control unit 50 driving the one or more actuators 55 to adjust a swashplate assembly to control the rotor blade assemblies 22 of FIG. 1. Alternatively, the FCC 75 can directly control the one or more actuators 55, and the actuator control unit 50 can be omitted.

The tail rotor system 18 can include an actuator control unit 60 configured to receive commands from the FCC 75 to control one or more actuators 65, such as a mechanical-hydraulic actuator, associated with one or more propeller blades 24. In an embodiment, pilot inputs 74 include a propeller pitch command for the actuator control unit 60 to drive the one or more actuators 65 for controlling the propeller blades FIG. 1. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 may be a digital electronic control unit such as Full Authority Digital Engine Control (FADEC) electronically interconnected to a corresponding engine E. Each engine E may include one or more instances of the EECU 80 to control engine output and performance. Engines E may be commanded in response to the pilot inputs 74, such as a throttle command.

Rather than simply passing pilot inputs 74 through to various control units 50, 60, and 80, the FCC 75 includes a processing system 90 that applies models and control laws to augment commands. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and may communicate with the control units 50, 60, 80, and other subsystems (not depicted).

The FCC 75 also includes an autonomous landing site selection system/module 202. The autonomous landing site selection module 202 may be in and/or coupled to memory 94. The autonomous landing site selection module 202 can be implemented as instructions stored on a computer-readable storage medium, as hardware modules, as special-purpose hardware (e.g., application specific hardware, Application Specific Integrated Circuits (ASICs), as embedded controllers, hardwired circuitry, etc.), or as some combination or combinations of these. In examples, the module described herein can be a combination of hardware and programming. The programming can be processor executable instructions stored on a tangible memory, and the hardware can include processing circuitry 92 for executing those instructions. Thus a system memory can store program instructions that when executed by processing circuitry 92 implement the module described herein. Alternatively or additionally, the FCC 75 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 3:
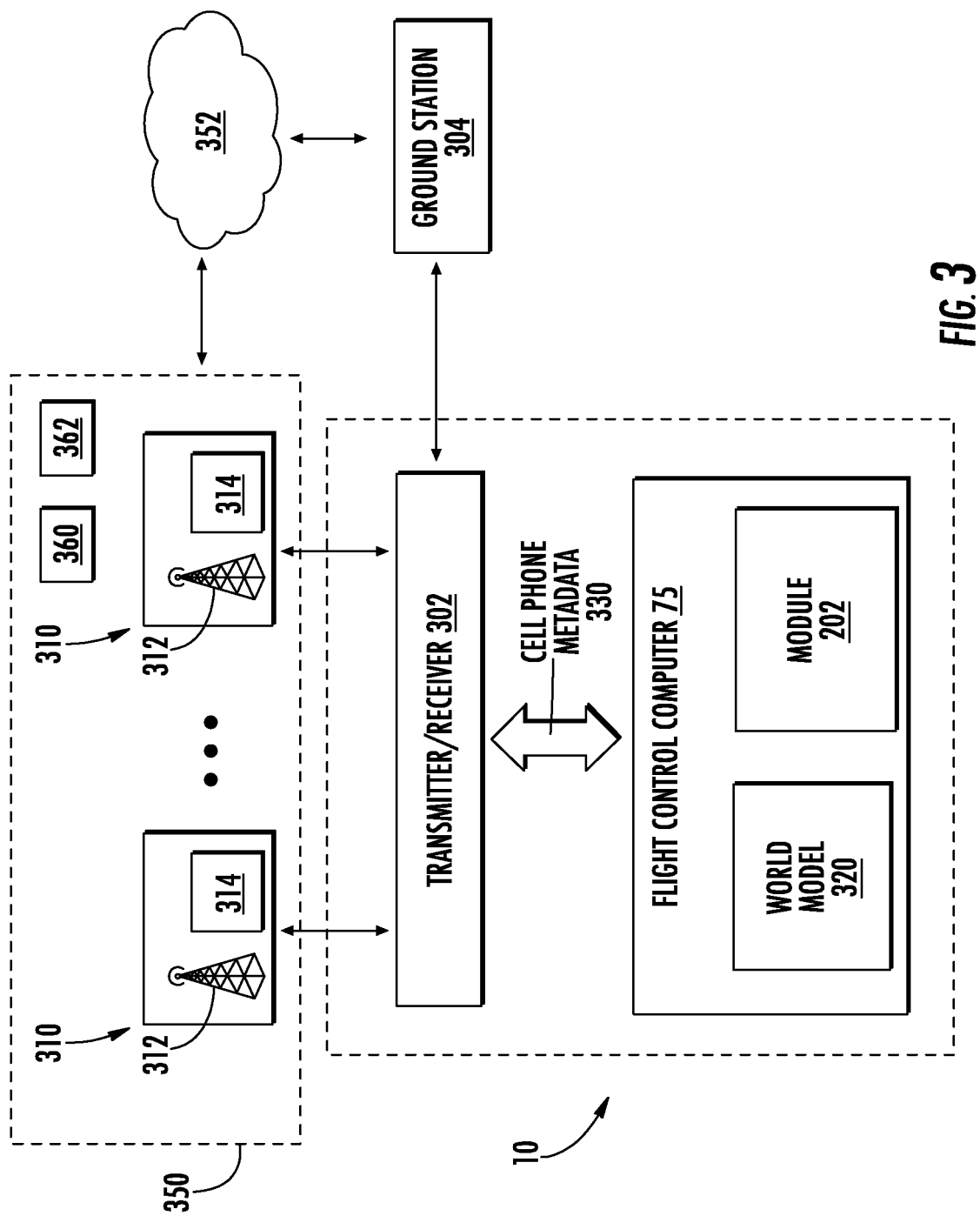
FIG. 3 depicts a block diagram utilizing an autonomous landing site selection module to autonomously evaluate landing sites for landing the aircraft in accordance with one or more embodiments.

FIG. 3 illustrates an example of the FCC 75 coupled to a transmitter/receiver 302 to receive cell phone metadata 330 according to one or more embodiments. Although some details of the FCC 75 are omitted in FIG. 3 so as not to obscure the figure, it should be understood that FCC 75 operates as discussed herein. The cell phone metadata 330 includes cell phone location data of cell phones in a particular area, such as around and at the landing site for the autonomous aircraft 10 as well as any planned routes for the autonomous aircraft 10. The cell phone metadata 330 includes cell phone density data around and at the landing site for the aircraft 10, and other locations that the aircraft 10 is intended to fly over and/or flies over. The autonomous landing site selection module 202 includes a world model 320 and/or the FCC 75 can include world model 320 in memory 94. The world model 320 may include terrain, obstacles (e.g., man-made and natural obstacles), world maps, etc. The autonomous landing site selection module 202 receives sensor data from the sensors 72 which is changing as the aircraft 10 flies. The sensors 72 may include laser detection and ranging (LADAR) sensors, light detection and ranging (LIDAR) sensors, and radio detection and ranging sensors, in addition to other types of sensors. The autonomous landing site selection module 202 receives and processes the cell phone metadata 330 in conjunction with the world model 320 and sensor data. The autonomous landing site selection module 202 is configured to overlay/ superimpose the cell phone metadata 330 and sensor data over the world model 320 including the landing site such as landing site 402 depicted in FIG. 4. Accordingly, the autonomous landing site selection module 202 captures and shows cell phone density data, which includes the cell phone density data as an amount of cell phones users present in a particular area/location on the world map. The autonomous landing site selection module 202 is configured to determine whether the landing site 402 is acceptable (e.g., meets a threshold requirement) or unacceptable (e.g., fails to meet the threshold requirement) based on the cell phone metadata 330 in conjunction with sensor data and the world model 320. In one or more embodiments, the autonomous landing site selection module 202 may overlay the cell phone metadata over the sensor data, may overlay the cell phone metadata over the world map (i.e., corresponding to areas of interest), and/or may overlay the cell phone metadata over some other coordinate system having latitude and longitude, waypoints, and/or global positioning system (GPS) coordinates. It should be appreciated that individual or combination of location type of data can be integrated with the cell phone metadata 330.

Figure 4:
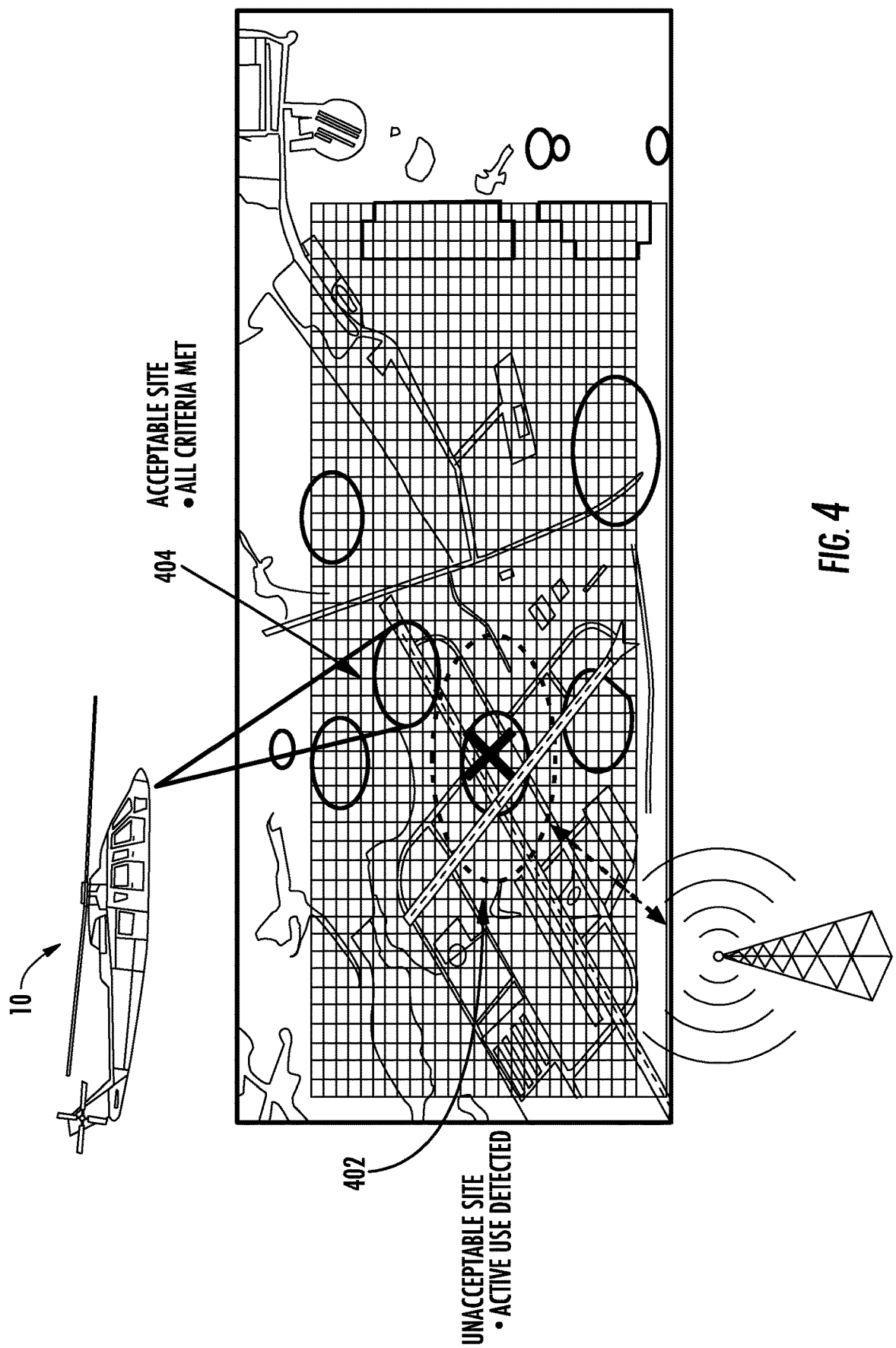
FIG. 4 depicts an example scenario utilizing an autonomous landing site selection module for landing the aircraft in accordance with one or more embodiments.

In determining whether the landing site 402 is acceptable or unacceptable, the autonomous landing site selection module 202 may have a threshold value (e.g., threshold requirement) such as a predefined number of cell phones and/or a predefined cell phone density for a predefined defined (e.g., a square of length X by length Y). When the cell phone metadata 330 is greater than and/or equal to the threshold value (e.g., does not meet the threshold requirement) at a particular landing site, the autonomous landing site selection module 202 is configured to determine that the landing site, for example, landing site 402, is an unacceptable site, as depicted by the "x" in FIG. 4. When the cell phone metadata 330 is less than the threshold value (e.g., meets the threshold requirement) for the particular landing site, the autonomous landing site selection module 202 is configured to determine that the landing site, for example, landing site 402 is an acceptable site. In the case when the landing site 402 is an unacceptable site as depicted in FIG. 4, the autonomous landing site selection module 202 is configured to find and select an alternative landing site 404. Similarly, the autonomous landing site selection module 202 determines whether alternative landing site 404 is acceptable or unacceptable based on the cell phone metadata 330 in conjunction with sensor data and the world model 320 as discussed herein. It may be assumed that landing site 404 is acceptable given the cell phone metadata 330 associated with the landing site 404. Accordingly, the autonomous landing site selection module 202 instructs and/or controls the FCC 75 to land the autonomous aircraft 10 as the alternative landing site 404 instead of the initially designated landing site 402. Although an example scenario is illustrated with two landing sites in FIG. 4, it should be appreciated that the autonomous landing site selection module 202 may process numerous landing sites before finding an acceptable landing site. Although example scenario discuss the autonomous landing site selection module 202 evaluating landing sites, the autonomous landing site selection module 202 is configured to also evaluate routes based on the cell phone metadata 330 as discussed herein. The autonomous landing site selection module 202 may choose to avoid flying over a ball field because the cell phone density is greater than an acceptable level, and/or can cause the autonomous aircraft 10 to fly above a predefined height when the cell phone density of a portion of the route is greater than an acceptable level. The acceptable level of the cell phone density for flying over a portion of the route may be greater than the threshold requirement of cell phone density for evaluating a landing site.

FIG. 3 illustrates a cellular network or mobile network 350 which is a communication network where the last link is wireless to communicate wirelessly (over radio waves) with mobile devices (e.g., cell phones, laptops, etc.). The cellular network is distributed over land areas called cells, which are served by base transceiver stations 314 coupled to cell towers 312. FIG. 3 illustrates numerous cell sites 310 each having cell tower 312 connected to base transceiver station 314. A base transceiver station 314 may be referred to as Node B in 3G technology, Evolved Node B (eNode B), base station, etc. The base transceiver stations 314 connect to a telecommunications network 352 including a public switched telephone network (PSTN) and the Internet. The base transceiver stations provide the cell with the network coverage which can be used for transmission of voice, data, and other types of content. The cellular network 350 may include a mobile switching center 360 as a connection point for the cellular network 350 connecting to the telecommunications network 352. The cellular network 350 may include a home location register 362 which is a device or service that can track users within the cellular network 350. The tracking may be done by identifying when a user connects with the cellular network 350 and may update the user's location. The base transceiver stations 314 are coupled to the mobile switching center 360 and home location register 362.

The base transceiver stations 314 are aware of the number of individual mobile devices (e.g., cell phones, laptops, etc.) to which they are connected to and/or in radio wave range of, and the base transceiver stations 314 can provide user location for the mobile devices in addition to user location provided by the home location register 362. The base transceiver stations 314 can provide user location by cellular geolocation, and the cellular geolocation can be performed with or without using a global positioning system (GPS). Cellular geolocation includes advanced forward link methods (e.g., triangulation) in which a mobile device is within range of at least three cell sites and where the carrier has implemented timing system use. Cellular geolocation can include angle of arrival (AoA) which occurs when a mobile device is in range of at least two cell sites. Cellular geolocation can include cellular assisted GPS which uses both satellite and cell phone signals.

As seen in FIG. 3, a ground station 304 can communicate with the cellular network 350 to obtain the cell phone metadata 330. The ground station 304 can include one or more computer systems (e.g., computer system 600) and communication equipment for communicating with the cellular network 350 via the telecommunications network 352 and communicating with the transmitter/receiver 302 of autonomous aircraft 10. The autonomous aircraft 10 may take off from the location of the ground station 304 and/or fly over the ground station 304, and autonomous aircraft 10 is configured to request the cell phone metadata 330 from and/or have the cell phone metadata 330 pushed from the ground station 304. As noted herein, the transmitter/receiver 302 receives the cell phone metadata 330 for evaluation by the autonomous landing site selection module 202. Additionally, the transmitter/receiver 302 can request and receive the cell phone metadata 330 from base transceiver stations 314 coupled to cell towers 312. The autonomous aircraft 10 can receive updates of the cell phone metadata 330 from the base transceiver stations 314 and/or ground station 304, along with other autonomous aircraft 10, while flying to a destination (including the landing site) and/or returning back to the ground station or another destination. The updates can occur as the autonomous aircraft 10 flies in range of the various base transceiver stations 314 which provide their cell phone metadata 330; also, the updates can occur periodically from the ground station 304 which receives updates of cell phone metadata 330 from the cellular network 350. Moreover, the autonomous landing site selection module 202 is configured to maintain real-time cell phone metadata 330 through the flight and landing of the autonomous aircraft 10.

Figure 5:
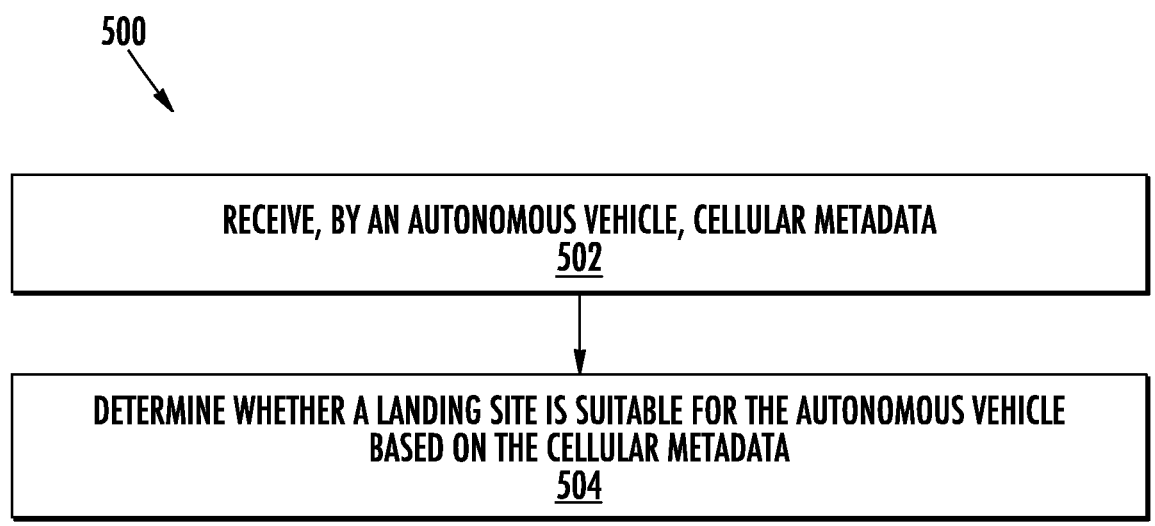
FIG. 5 depicts a flow chart of a method for evaluating autonomous landing of an autonomous aircraft in accordance with one or more embodiments.

FIG. 5 depicts a flow chart of a method 500 for evaluating autonomous landing of the autonomous aircraft 10 according to one or more embodiments. At block 502, the autonomous landing site selection module 202 of the autonomous vehicle is configured to receive cellular metadata (e.g., cell phone metadata 330). The cell phone metadata 330 can be received from one or more ground station 304 and/or one or more base transceiver stations 314, at any point before flight, during flight, while landing, etc. At block 504, the autonomous landing site selection module 202 is configured to determine whether a landing site (e.g., landing site 402) is suitable for the autonomous vehicle based on the cellular metadata.

The autonomous landing site selection module 202 is configured to select the landing site to land the autonomous vehicle in response to determining that the landing site is suitable based on the cellular metadata. The autonomous landing site selection module 202 is configured avoid landing at the landing site (e.g., landing site 402) and select an alternative landing site (e.g., landing site 404) in response to determining that the landing site (e.g., landing site 402) is unsuitable based on the cellular metadata. The autonomous landing site selection module 202 is configured to check whether the alternative landing site (e.g., landing site 404) is suitable based on the cellular metadata and select the alternative landing site (e.g., landing site 404) to land the autonomous vehicle (e.g., autonomous aircraft 10) in response to determining that the alternative landing site (e.g., landing site 404) is suitable based on the cellular metadata.

The cellular metadata (e.g., cellular phone metadata 330) comprises cellular phone density data (e.g., number of users/mobile devices) associated with the landing site (e.g., landing site 402, alternative landing site 404, and/or other potential landing sites). Determining whether the landing site (e.g., landing site 402) is suitable based on the cellular metadata comprises the autonomous landing site selection module 202 checking whether cellular phone density data associated with the landing site meets a threshold requirement. The autonomous landing site selection module 202 is configured to land the autonomous vehicle at the landing site in response to the cellular phone density data associated with the landing site meeting the threshold requirement. The autonomous landing site selection module 202 is configured to avoid the landing site in response to the cellular phone density data associated with the landing site failing to meet the threshold requirement. For example, the autonomous landing site selection module 202 can continue evaluating landing sites until a suitable landing site is found, and/or can choose a landing site with the least amount of cell phone density when no landing site meets the threshold requirement. The autonomous vehicle is an aircraft.

Figure 6:
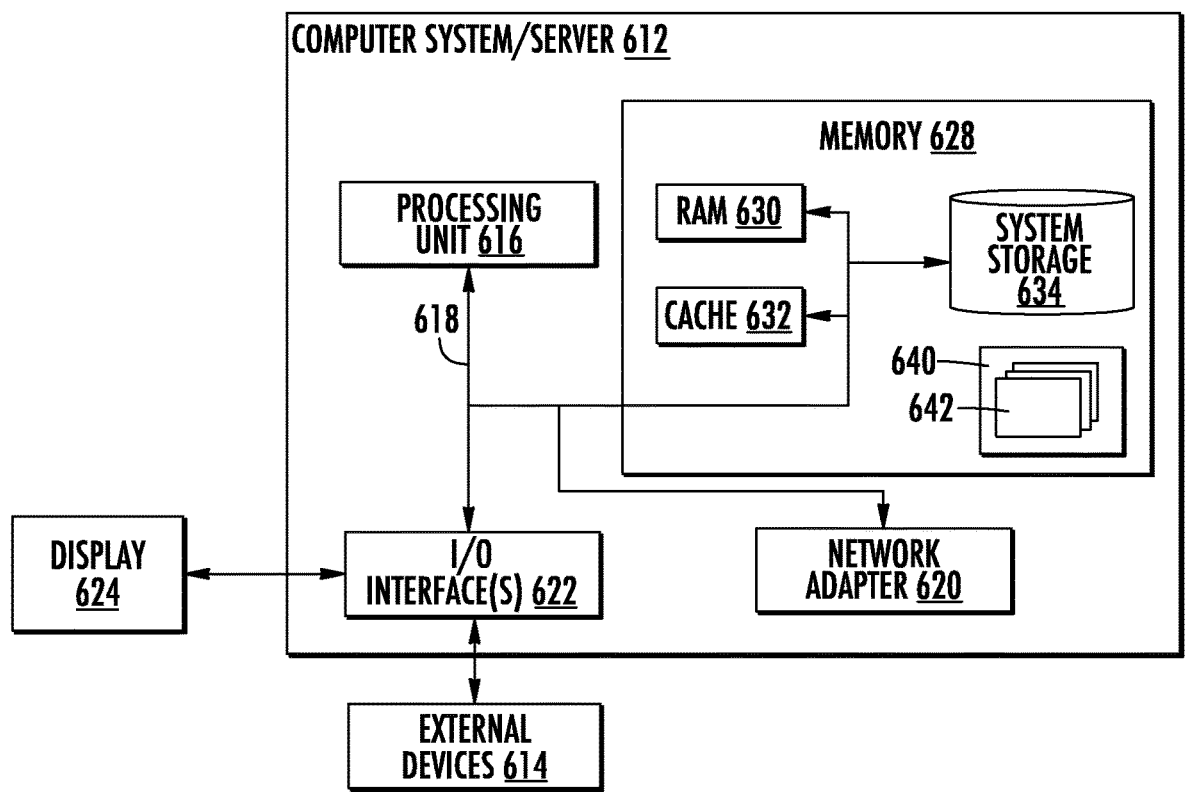
FIG. 6 depicts a schematic of an example computing system having functions and features utilized in accordance with one or more embodiments.

FIG. 6 depicts a schematic of an example computing system 612 having functions and features utilized according to one or more embodiments. The computer system 612 can be operational with numerous other general purpose or special purpose computing system environments or configurations. The computer system 612 can be representative of various types of computer systems on which operations and functions can run in the aircraft 10. The functions and capabilities of computing system 612 can be utilized in FIGS. 1-5 to implement one or more features of the ground station 304, cellular network 350, the flight control system 70 including flight control computer 75 and autonomous landing site selection module 202, etc., according to embodiments.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

The components of computer system 612 may include, but are not limited to, one or more processors or processing units 616, a system memory 628, and a bus 618 that couples various system components including system memory 628 to processor 616. Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 612 typically includes a variety of computer system readable media. Such media may be any available media that is accessible by computer system 612, and it includes both volatile and non-volatile media, removable and non-removable media. The system memory 628 can include computer system readable media in the form of volatile memory, such as random access memory (RAM) 630 and/or cache memory 632. Computer system 612 may further include other removable/non-removable, volatile/non-volatile computer system storage media. By way of example only, storage system 634 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. Memory 628 may include at least one program product having a set (e.g., at least one) of program modules that are configured to carry out the functions of embodiments.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments as described herein.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via Input/Output (I/O) interfaces 622. Still yet, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include but are not limited to: microcode, device drivers, redundant processing units, external disk drive arrays, RAID systems, tape drives, and data archival storage systems, etc.

Embodiments may be a system, a method, and/or a computer program product at any possible technical detail level of integration. The computer program product may include a computer readable storage medium (or media) having computer readable program instructions thereon for causing a processor to carry out embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform embodiments.

Embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. By way of example, aspects of the invention can be used in other forms of aircraft, including coaxial aircraft, tilt rotor aircraft and fixed wing aircraft. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for evaluating autonomous landing, the method comprising:
   receiving, by an autonomous vehicle, cellular metadata that identifies a number of cell phone users proximate to a candidate landing site; and
   determining that the candidate landing site is suitable for landing the autonomous vehicle based on the number of cell phone users proximate to the candidate landing site satisfying a predetermined threshold.

2. The method of claim 1, further comprising selecting the candidate landing site in response to determining that a second candidate landing site is unsuitable.

3. The method of claim 2, further comprising determining that the second candidate landing site is unsuitable based on the cellular metadata.

4. The method of claim 1, wherein the cellular metadata comprises cellular phone density data associated with the candidate landing site.

5. The method of claim 1, further comprising landing the autonomous vehicle at the candidate landing site responsive to determining that the candidate landing site is suitable for landing.

6. The method of claim 1, further comprising avoiding a second candidate landing site in response to cellular phone density data associated with the second candidate landing site failing to meet the predetermined threshold.

7. The method of claim 1, wherein the autonomous vehicle is an aircraft.

8. A system for evaluating autonomous landing, the system comprising:
   a processor; and
   memory coupled to the processor and comprising computer-executable instructions that, when executed by the processor, cause the processor to perform operations comprising:
      receiving, via an autonomous vehicle, cellular metadata that identifies a number of cell phone users proximate to a candidate landing site; and
      determining that the candidate landing site is suitable for landing the autonomous vehicle based on the number of cell phone users proximate to the candidate landing site satisfying a predetermined threshold.

9. The system of claim 8, wherein the operations further comprise selecting the candidate landing site in response to determining that a second candidate landing site is unsuitable.

10. The system of claim 9, wherein the operations further comprise determining that the second candidate landing site is unsuitable based on the cellular metadata.

11. The system of claim 8, wherein the cellular metadata comprises cellular phone density data associated with the candidate landing site.

12. The system of claim 8, wherein the operations further comprise landing the autonomous vehicle at the candidate landing site responsive to determining that the candidate landing site is suitable for landing.

13. The system of claim 8, wherein the operations further comprise avoiding a second candidate landing site in response to cellular phone density data associated with the second candidate landing site failing to meet the predetermined threshold.

14. The system of claim 8, wherein the autonomous vehicle is an aircraft.

* * * * *